United States Patent
Li et al.

(10) Patent No.: US 11,844,023 B2
(45) Date of Patent: Dec. 12, 2023

(54) SYSTEMS AND METHODS OF ADAPTIVE POWER SAVING FOR WIRELESS TRAFFIC

(71) Applicant: Meta Platforms Technologies, LLC, Menlo Park, CA (US)

(72) Inventors: Guoqing Li, Cupertino, CA (US); Dong Zheng, Saratoga, CA (US); Gang Lu, Pleasanton, CA (US); Qi Qu, Redmond, WA (US); Abhishek Kumar Agrawal, Bellevue, WA (US); Nabeel Ahmed, San Jose, CA (US); Amit Shukla, Fremont, CA (US); Xiaoguang Wang, Sunnyvale, CA (US); Chunyu Hu, Saratoga, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/506,182

(22) Filed: Oct. 20, 2021

(65) Prior Publication Data
US 2022/0264463 A1    Aug. 18, 2022

Related U.S. Application Data

(60) Provisional application No. 63/148,993, filed on Feb. 12, 2021.

(51) Int. Cl.
*H04W 52/02*     (2009.01)
*H04W 24/04*     (2009.01)
*H04W 8/18*      (2009.01)

(52) U.S. Cl.
CPC ......... *H04W 52/0235* (2013.01); *H04W 8/18* (2013.01); *H04W 24/04* (2013.01)

(58) Field of Classification Search
CPC ... H04W 52/0235; H04W 8/18; H04W 24/04; H04W 76/20
See application file for complete search history.

(56) References Cited

U.S. PATENT DOCUMENTS 8,060,119 B2 * 11/2011 Keidar ............. H04W 52/0229
                                              455/435.2
9,426,261 B2 *  8/2016 Asterjadhi .......... H04W 84/12
                         (Continued)

OTHER PUBLICATIONS

International Search Report and Written Opinion for International Application No. PCT/US2022/015871, dated May 24, 2022, 11 pages.

*Primary Examiner* — Kibrom T Hailu
(74) *Attorney, Agent, or Firm* — Foley & Lardner LLP

(57) ABSTRACT

Disclosed herein are related to dynamically adjusting a wake time and a sleep time for wireless communication between two or more devices to reduce power consumption. In one aspect, a first device enters a wake up state to wirelessly communicate with a second device for a service period with a determined duration scheduled according to a target wake time (TWT) protocol. In one aspect, the first device monitors for one or more indicators from the second device indicating that additional data is available for communication. In one aspect, the first device extends the service period beyond the determined duration, in response to receiving a first indicator of the one or more indicators. In one aspect, the first device communicates with the second device the additional data during the service period extended beyond the determined duration.

20 Claims, 6 Drawing Sheets

(56) References Cited

U.S. PATENT DOCUMENTS

| | | |
|---|---|---|
| 2019/0045438 A1 | 2/2019 | Cariou et al. |
| 2019/0253968 A1 | 8/2019 | Xiao et al. |
| 2020/0045634 A1 | 2/2020 | Kneckt et al. |
| 2020/0137612 A1 | 4/2020 | Li et al. |
| 2020/0344754 A1 | 10/2020 | Qu et al. |
| 2021/0037464 A1* | 2/2021 | Cariou .............. H04W 52/0229 |
| 2022/0039086 A1* | 2/2022 | Asterjadhi ............ H04W 72/23 |

\* cited by examiner

SYSTEMS AND METHODS OF ADAPTIVE POWER SAVING FOR WIRELESS TRAFFIC

CROSS-REFERENCE TO RELATED APPLICATION

This application claims priority to U.S. Provisional Patent Application No. 63/148,993 filed on Feb. 12, 2021, which is incorporated by reference herein in its entirety.

FIELD OF DISCLOSURE

The present disclosure is generally related to wireless communication, including but not limited to reducing latency in wireless communication for artificial reality.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a method for adjusting wireless communication between a first device and a second device. In some embodiments, the method includes entering, by a first device, a wake up state to wirelessly communicate with a second device for a service period with a determined duration scheduled according to a target wake time (TWT) protocol. In some embodiments, the method includes monitoring, by the first device, for one or more indicators from the second device indicating that additional data is available for communication. In some embodiments, the method includes extending, by the first device, the service period beyond the determined duration, in response to receiving a first indicator of the one or more indicators. In some embodiments, the method includes communicating, by the first device with the second device, the additional data during the service period extended beyond the determined duration.

In some embodiments, the method includes entering, by the first device after the service period extended beyond the determined duration, a sleep state until a start time of another service period subsequent to the service period. In some embodiments, the method includes receiving, by the first device, a second indicator of the one or more indicators, after extending the service period. In some embodiments, the method includes determining, by the first device in response to the second indicator, that further extending the service period responsive to the second indicator would exceed a maximum time duration for the service period. In some embodiments, the method includes bypassing, by the first device, the further extending of the service period, in response to the determination that further extending the service period responsive to the second indicator would exceed the maximum time duration.

In some embodiments, the method includes determining, by the first device in response to receiving the first indicator, that further extending the service period responsive to the first indicator would not exceed a maximum time duration for the service period. In some embodiments, the method includes further extending, by the first device, the service period, in response to the determination that further extending the service period responsive to the first indicator would not exceed the maximum time.

In some embodiments, the first indicator is an end of service period (ESOP) bit, a buffer status report (BSR) bit, or a more data field value. In some embodiments, the method includes performing, by the first device, a periodic adjustment of one or more parameters, the one or more parameters including at least one of a start time of a first service period, a duration of the first service period, or a duration between the start time of the first service period and a start time of a second service period subsequent to the first service period. In some embodiments, a frequency of the periodic adjustment is based on a difference between i) a resolution of a first clock of the first device, based on which an image frame is generated, and ii) a resolution of a second clock of the first device, based on which wireless communication with the second device is performed. In some embodiments, performing the periodic adjustment comprises synchronizing, by the first device, the first clock and the second clock of the first device.

In some embodiments, the first device is a head wearable display and the second device is a computing device that generates image data for display by the head wearable display. In some embodiments, the second device is a head wearable display and the first device is a computing device that generates image data for display by the head wearable display.

Various embodiments disclosed herein are related to a first device for wireless communication. In some embodiments, the first device includes a wireless interface to wirelessly communicate with a second device. In some embodiments, the first device includes one or more processors. In some embodiments, the one or more processors are configured to cause the wireless interface to enter a wake up state to wirelessly communicate with a second device for a service period with a determined duration scheduled according to a target wake time (TWT) protocol. In some embodiments, the one or more processors are configured to cause the wireless interface to monitor for one or more indicators from the second device indicating that additional data is available for communication. In some embodiments, the one or more processors are configured to extend the service period beyond the determined duration, in response to receiving a first indicator of the one or more indicators. In some embodiments, the one or more processors are configured to cause the wireless interface to communicate with the second device the additional data during the service period extended beyond the determined duration.

In some embodiments, the one or more processors are configured to cause the wireless interface to enter, after the service period extended beyond the determined duration, a sleep state until a start time of another service period subsequent to the service period. In some embodiments, the one or more processors are configured to cause the wireless interface to receive a second indicator of the one or more indicators, after extending the service period. In some embodiments, the one or more processors are configured to determine, in response to the second indicator, that further extending the service period responsive to the second indicator would exceed a maximum time duration for the service period. In some embodiments, the one or more processors are configured to bypass the further extending of the service period, in response to the determination.

In some embodiments, the one or more processors are configured to determine, in response to receiving the first indicator, that further extending the service period responsive to the first indicator would not exceed a maximum time duration for the service period. In some embodiments, the one or more processors are configured to further extend the service period, in response to the determination.

In some embodiments, the first indicator is an end of service period (ESOP) bit, a buffer status report (BSR) bit, or a more data field value. In some embodiments, the one or more processors are configured to perform a periodic adjustment of one or more parameters, the one or more parameters including at least one of a start time of a first service period, a duration of the first service period, or a duration between the start time of the first service period and a start time of a second service period subsequent to the first service period. In some embodiments, a frequency of the periodic adjustment is based on a difference between i) a resolution of a first clock of the one or more processors, and ii) a resolution of a second clock of the wireless interface. In some embodiments, the one or more processors are configured to synchronize, for each periodic adjustment, the first clock and the second clock of the first device.

In some embodiments, the first device is a head wearable display and the second device is a computing device that generates image data for display by the head wearable display. In some embodiments, the second device is a head wearable display and the first device is a computing device that generates image data for display by the head wearable display.

Various embodiments disclosed herein are related to a non-transitory computer readable medium storing instructions for wireless communication. In some embodiments, the instructions when executed by one or more processors, cause a wireless interface to enter a wake up state to wirelessly communicate with a separate device for a service period with a determined duration scheduled according to a target wake time (TWT) protocol. In some embodiments, the instructions when executed by the one or more processors, cause the wireless interface to monitor for one or more indicators from the separate device indicating that additional data is available for communication. In some embodiments, the instructions when executed by the one or more processors, extend the service period beyond the determined duration, in response to receiving a first indicator of the one or more indicators. In some embodiments, the instructions when executed by the one or more processors, cause the wireless interface to communicate with the separate device, the additional data during the service period extended beyond the determined duration.

Various embodiments disclosed herein are related to a method of for adjusting wireless communication between a first device and a second device. In some embodiments, the first device enters a wake up state to wirelessly communicate with a second device for a service period with a determined duration scheduled according to a target wake time (TWT) protocol. In some embodiments, the first device monitors for one or more indicators from the second device indicating that additional data is available for communication. In some embodiments, the first device determines that a last packet is transmitted to the second device for the service period. In some embodiments, the first device determines that the second device has no additional data left to transmit for the service period, according to the one or more indicators. In some embodiments, the first device enters a sleep state before an end of the service period, in response to determining that the last packet is transmitted to the second device for the service period and in response to determining that the second device has no additional data left to transmit for the service period.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
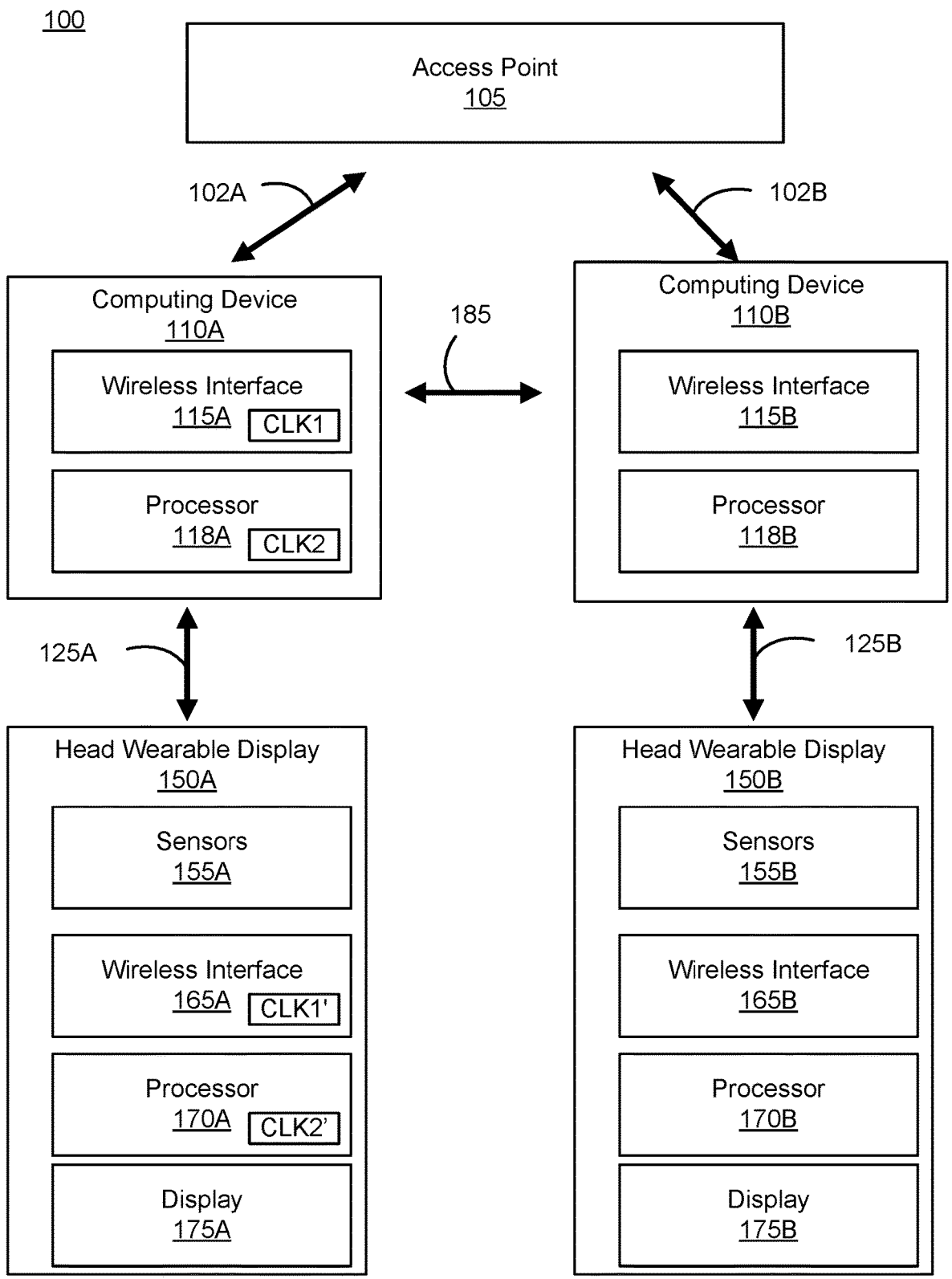
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for remotely rendering an artificial reality space (e.g., an AR space, a VR space, or a MR space) by adaptively allocating resources or time slots for communication of data based on utilization and priorities of channel access.

In one configuration, two or more devices may communicate with each other pursuant to a target wake time (TWT) protocol. For example, within a service period interval, two or more devices may alternate operating in a wake up state during a service period (SP) duration and in a sleep state during a sleep duration. In the wake up state, two or more devices may communicate with each other, for example, through a wireless link. In the sleep state, two or more devices may disable communication to reduce power consumption. The SP duration and the sleep duration may be scheduled or predetermined according to an estimated traffic amount or pattern.

In some embodiments, a wake time and a sleep time for wireless communication between two or more devices can be dynamically adjusted to allow communication with reduced latency and low power consumption. For example, one or more indicators conforming to TWT protocol such as end of service period (ESOP) bits, buffer status report (BSR) bits, or more data field values can be utilized to adjust a SP duration. In one aspect, one or more indicators may be utilized to dynamically extend or reduce the scheduled SP duration, depending on an amount of data to be communicated. For example, the SP duration can be shortened or reduced when one or more indicators indicate that no additional data is left to communicate (or that a last packet is being transmitted) for the SP Duration. For example, the SP duration can be extended when one or more indicators indicate that additional data exists (or that a last packet is not being transmitted) for the SP duration. By extending the SP duration, the additional data can be exchanged or communicated without having to wait for the next SP duration to achieve latency reduction.

In one aspect, the SP duration can be adjusted after a number of service period intervals to synchronize clocks. The service period interval may correspond to a frame time (e.g., 16.6666 ms) for presenting images, e.g., images for artificial reality. In one aspect, the number of service period intervals may be determined according to a difference in resolutions of two clocks. For example, a device includes one or more processors for processing and rendering an image, and a wireless interface for wireless communication. The one or more processors may operate synchronized to a first clock and the wireless interface may operate synchronized to a second clock, where the first clock and the second clock have different resolutions. For example, the first clock can be configured in the increment of 0.6666 ms, where the second clock can be configured in the increment of 1 μs. The difference in resolutions of two clocks may create an offset in operation of the one or more processors and the wireless interface, and such difference may accumulate over time to cause power inefficiency or lower data throughput. In one aspect, the SP duration can be periodically adjusted or shifted for a number of service period intervals to correct the offset between two clocks within a single device. The number of service period intervals may be an integer number that is a multiple of a difference between the configurable increment of the first clock and the configurable increment of the second clock.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a computing device or a mobile device that can retrieve content from the access point 105, and can provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may operate according to or in synchronous to a clock CLK1'. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may operate according to or in synchronous to a clock CLK2'. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and/or depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may operate according to or in synchronous to a clock CLK1. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, or any wireless communication link. The wireless interface 115 may also include a component to communicate with a different computing device 110 through a wireless link 185. Examples of the wireless link 185 include a near field communication link, Wi-Fi direct, Bluetooth, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. The processor 118 may operate according to or in synchronous to a clock CLK2. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep state (e.g., low power or inactive state) and a wake up state (e.g., active state). In the wake up state, the processor 118 may enable the wireless interface 115, and the processor 170 may enable the wireless interface 165, such that the wireless interfaces 115, 165 may exchange data. In the sleep state, the processor 118 may disable the wireless interface 115 and the processor 170 may disable (e.g., may implement low power or reduced operation in) the wireless interface 165, such that the wireless interfaces 115, 165 may not consume power, or may reduce power consumption. The processors 118, 170 may schedule the wireless interfaces 115, 165 to switch between the sleep state and the wake up state periodically every frame time (e.g., 11 ms or 16 ms). For example, the wireless interfaces 115, 165 may operate in the wake up state for 2 ms of the frame time, and the wireless interfaces 115, 165 may operate in the sleep state for the remainder (e.g., 9 ms) of the frame time. By disabling the wireless interfaces 115, 165 in the sleep state, power consumption of the computing device 110 and the HWD 150 can be reduced or minimized.

In some embodiments, the processors 118, 170 may configure or cause the wireless interfaces 115, 165 to resume communication based on stored information indicating (e.g., to use for coordinating) communication between the computing device 110 and the HWD 150. In the wake up state, the processors 118, 170 may generate and store information (e.g., channel, timing) of the communication between the computing device 110 and the HWD 150. The processors 118, 170 may schedule the wireless interfaces 115, 165 to enter a subsequent wake up state according to timing of the previous communication indicated by the stored information. For example, the wireless interfaces 115, 165 may predict/determine when to enter the subsequent wake up state, according to timing of the previous wake up state, and can schedule to enter the subsequent wake up state at the predicted time. After generating and storing the information and scheduling the subsequent wake up state, the processors 118, 170 may configure or cause the wireless interfaces 115, 165 to enter the sleep state. When entering the wake up state, the processors 118, 170 may cause or configure the wireless interfaces 115, 165 to resume communication via the channel or frequency band of the previous communication indicated by the stored information. Accordingly, the wireless interfaces 115, 165 entering the wake up state from the sleep state may resume communication, while bypassing a scan procedure to search for available channels and/or performing handshake or authentication. Bypassing the scan procedure allows extension of a duration of the wireless interfaces 115, 165 operating in the sleep state, such that the computing device 110 and the HWD 150 can reduce power consumption.

In some embodiments, the computing devices 110A, 110B may coordinate operations to reduce collisions or interferences. In one approach, the computing device 110A may transmit a beacon frame periodically to announce/advertise a presence of a wireless link 125A between the computing device 110A and the HWD 150A and can coordinate the communication between the computing device 110A and the HWD 150A. The computing device 110B may monitor for or receive the beacon frame from the computing device 110A, and can schedule communication with the HWD 150B (e.g., using information in the beacon frame, such as an offset value) to avoid collision or interference with communication between the computing device 110A and the HWD 150A. For example, the computing device 110B may schedule the computing device 110B and the HWD 150B to enter a wake up state, when the computing device 110A and the HWD 150A operate in the sleep state. For example, the computing device 110B may schedule the computing device 110B and the HWD 150B to enter a sleep mode/state, when the computing device 110A and the HWD 150A operate in the wake up state. Accordingly, multiple computing devices 110 and HWDs 150 in proximity (e.g., within 20 ft) may coexist and operate with reduced interference.

Figure 2:
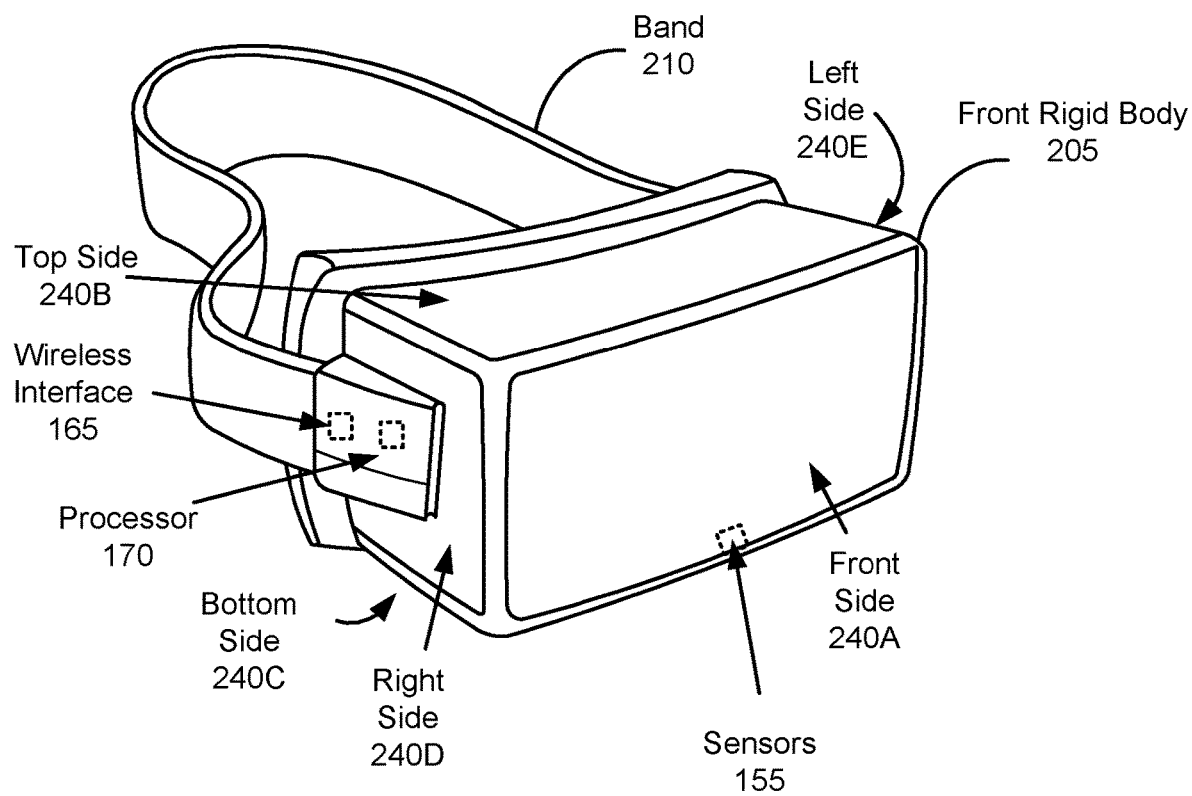
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), lens (not shown in FIG. 2), the sensors 155, the wireless interface 165, and the processor 170. In the embodiment shown by FIG. 2, the wireless interface 165, the processor 170, and the sensors 155 are located within the front rigid body 205, and may not be visible to the user. In other embodiments, the HWD 150 has a different configuration than shown in FIG. 2. For example, the wireless interface 165, the processor 170, and/or the sensors 155 may be in different locations than shown in FIG. 2.

Figure 3:
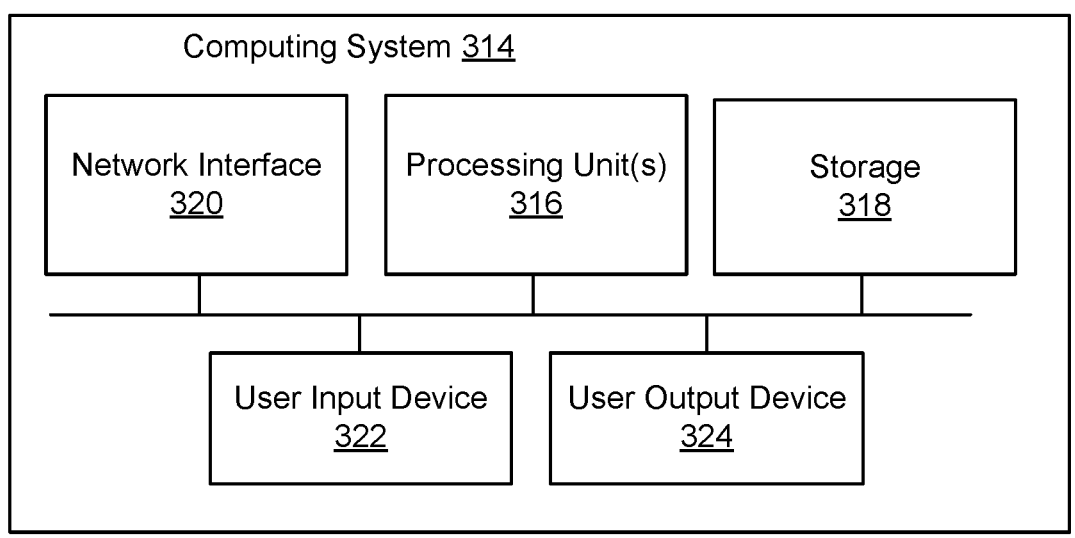
FIG. 3 is a block diagram of a computing environment, according to an example implementation of the present disclosure.

Various operations described herein can be implemented on computer systems. FIG. 3 shows a block diagram of a representative computing system 314 usable to implement the present disclosure, in accordance with an example embodiment. In some embodiments, the AP 105, the console 110, the HWD 150 or any combination of them of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests for information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 4:
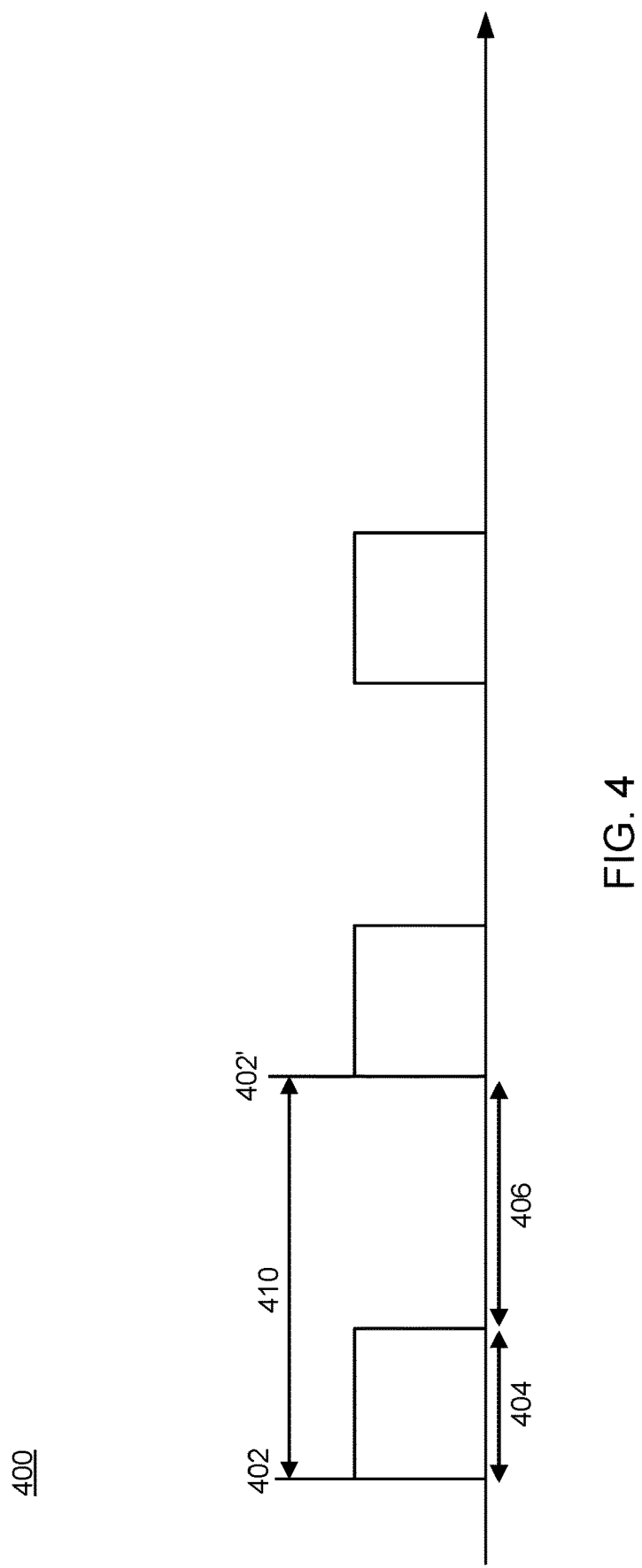
FIG. 4 is a timing diagram showing a wake-up/sleep schedule of a computing device utilizing TWT, according to an example implementation of the present disclosure.

FIG. 4 is a timing diagram 400 showing a wake-up/sleep schedule of a computing device 110 and a HWD 150 utilizing Target Wake Time (TWT), according to an example implementation of the present disclosure. TWT is a time agreed upon by a computing device 110 and the HWD 150, or specified/configured by another device (e.g., the access point 105). A TWT may be characterized by a periodic, fixed, wake-sleep schedule. The computing device 110 and the HWD 150 can wake up periodically (e.g., at a fixed, configured time interval/period/cycle) based on the TWT.

The interval of time between TWT start time 402 and the subsequent TWT start time 402' is the SP interval 410. The SP interval 410 may correspond to a frame time (e.g., 16.6666 ms) for presenting artificial reality. Within the SP interval 410, the computing device 110 and the HWD 150 may alternate (or transition from) operating in a wake up state during a SP duration 404 and in a sleep state during a sleep duration 406.

In some embodiments, the computing device 110 and the HWD 150 may enter the wake up state at TWT start time 402. The computing device 110 and the HWD 150 may operate in the wake up state for the SP duration 404. In the wake up state, the computing device 110 and the HWD 150 may enable the processors (e.g., processors 118, 170) and the wireless interfaces (e.g., wireless interfaces 115, 165), and transmit and/or receive data, for example, for presenting artificial reality.

In some embodiments, at the end of the SP duration 404, the computing device 110 and the HWD 150 may enter a sleep state. The computing device 110 and the HWD 150 may operate in the sleep state during the sleep duration 406, until a subsequent TWT start time 402'. In the sleep state, the computing device 110 and the HWD 150 may disable or power off the processors (e.g., processors 118, 170) and the wireless interfaces (e.g., wireless interfaces 115, 165) to achieve power savings.

In some embodiments, the TWT start time 402, 402' may be used to synchronize clocks within a device. For example, a video clock CLK2 (e.g., clock for timing, generating and/or processing video frames) may not be aligned with a wireless clock CLK1 (e.g., clock for timing/scheduling/processing transmissions and/or reception of wireless messages) within a device. Methods may be used to align the wireless clocks CLK1, CLK1' and the video clocks CLK2, CLK2' in the computing device 110 and HWD 150. In one approach, the computing device 110 and the HWD 150 may synchronize wireless clocks CLK1, CLK1' of the wireless interfaces 115, 165 when communicating with each other. However, clock misalignment may be present within a single device, between a wireless clock CLK1 and a video clock CLK2, due to clock drift between the individual clock crystals over time. For example, the computing device 110 may have to wait to transmit video packets if the video clock CLK2 of the processor 118 lags behind the wireless clock CLK1 of the wireless interface 115. The time wasted waiting for the preparation of packets due to misaligned clocks may cause increased latency and/or waste power resources by unnecessarily extending wake-up time for WiFi operation (e.g., in the wireless module/circuitry/chip). Similarly, the computing device 110 may wake-up and prepare video packets, but not be able to transmit the video packets if the wireless clock CLK1 of the wireless interface 115 lags behind the video clock CLK2 of the processor 118. The misalignment of the clocks CLK1, CLK2 may be worsened by resolution differences between the clocks. For example, the video clock CLK2 of the processor 118 may be configured in the increment of milliseconds, but the wireless clock CLK1 of the wireless interface 115 may be configured in the increment of microseconds. For instance, a 60 Hz video frame may start every 16.66 ms, whereas a TWT SP interval may be set or configured to integer number of microseconds. Accordingly, the clocks CLK1, CLK2 may be offset by the remainder of 0.66 ms which is added/accumulated for each/every video frame. As such, the clock drift may worsen over time.

In some embodiments, a field in the TWT protocol (for example, a field in the TWT Information frame) may be established/configured/modified/repurposed to include a shift/adjustment to the start time of the next SP duration 404 to counter the effect of the clock misalignment. For example and in some embodiments, the "Next Wake Up" time field, indicating the start time 402' of the next SP duration 404, may be periodically adjusted to address/correct clock misalignment. Every N video frames (or at some other interval or event trigger), the wake-up time of the computing device 110 and/or the HWD 150 may be shifted/adjusted. N may be a number configured based on the video frame rate because the clock drift and clock offset can depend on the video frame rate. For example, N may be an integer number that is a multiple of a difference between the configurable increment of the video clock CLK2 and the configurable increment of the wireless clock CLK1. In some embodiments, the parameters of the TWT may be negotiated and/or updated in management frames such as the TWT request frame and a TWT response frame. The TWT may be paused and/or resumed at the beginning of a TWT start time via a TWT Information Frame (sometimes referred to as TWT Info frame) and an ACK frame.

Streams of traffic across a network may be characterized by different types of traffic. For instance, an application may be characterized by latency sensitive data (e.g., video/voice (VINO), real time interactive applications, and the like) or other data (e.g., best effort/background applications (BE/BK)). Latency sensitive data may be identifiable by its characteristic of periodic bursts of traffic. For instance, video display traffic may be driven by the refresh rate 60 Hz, 72 Hz, 90 Hz, and 120 Hz. An application and/or device may have combinations of traffic types. Further, each stream of traffic associated with the application and/or device may be more or less spontaneous and/or aperiodic than the other streams of traffic associated with the application and/or device. Thus, traffic may vary according to applications and/or channel rate dynamics.

For example, the duration of traffic to be transmitted may depend on the transmission rate, which may depend on various algorithms adapting to channel conditions. Further, the traffic duration may depend on the occupancy of the wireless medium. For instance, computing devices implementing contention based medium access protocols may wait a duration of time before being able to contend to transmit traffic using the medium. Additionally or alternatively, the amount of traffic to be transmitted may be aperiodic, bursty, and the like. For example, a video that has been compressed may occupy one or more frames of different sizes. That is, the compressed video frame size may not be constant.

As discussed herein, the TWT can be a negotiated and agreed upon time. Further, both traffic transmissions and traffic durations are variable in nature. As such, the SP duration 404 may be longer than a time duration for the computing device 110 to transmit content or data (e.g., image data for AR/VR) of the computing device 110. Accordingly, the computing device 110 may be awake for longer than the time needed to transmit traffic, resulting in the computing device 110 inefficiently consuming power. Additionally or alternatively, the SP duration 404 may be shorter than a time duration for the computing device 110 to transmit content or data (e.g., image data for AR/VR). Accordingly, the computing device 110 may be caused to wait until the subsequent SP duration 404 to transmit packets. Waiting for the subsequent SP duration 404 may add unnecessary latency and/or packet loss. The TWT may be improved by adaptively waking up and entering a sleep state based on traffic conditions/characteristics/types. The traffic-adaptive mechanism can allow the computing device 110, HWD 150, access point 105, or any combination of them to enter sleep and/or wake up state(s) based on the traffic needs/conditions/characteristics/types, improving the tradeoff between power consumption and low latency transmissions.

Figure 5:
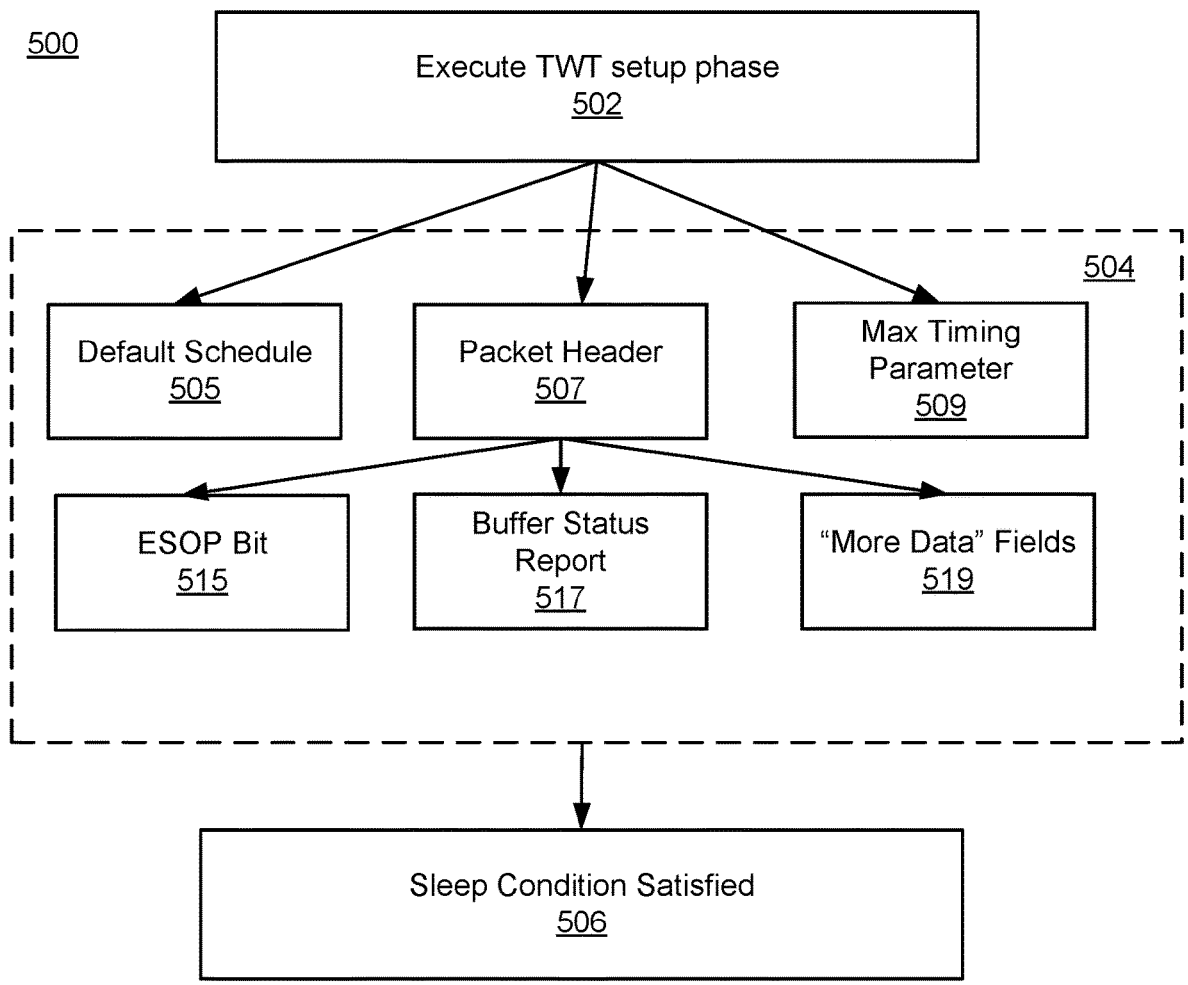
FIG. 5 is a flowchart showing a process of improving power consumption in a computing device while communicating latency sensitive data using TWT, according to an example implementation of the present disclosure.

FIG. 5 is a flowchart showing a process 500 of improving power consumption in a computing device 110 while communicating latency sensitive data using TWT, according to an example implementation of the present disclosure. In some embodiments, the process 500 is performed by the computing device 110. In some embodiments, the process 500 is performed by other entities (e.g., access point 105 or HWD 150). In some embodiments, the process 500 includes more, fewer, or different steps than shown in FIG. 5.

In step 502, the computing device 110 may execute or perform a TWT setup phase. The computing device 110 and the HWD 150 may agree on values for the TWT parameters, according to the negotiation process. For instance, the computing device 110 or HWD 150 may negotiate TWT parameters such as a TWT start time 402, the SP duration 404, and/or the SP interval 410.

During the TWT setup phase in the step 502, the computing device 110 and the HWD 150 may store, employ or utilize settings or configurations 504. Example settings or configurations 504 include default schedule 505, packet header 507, and max timing parameter 509. In one approach, the computing device 110 and the HWD 150 may operate according to the default schedule 505 including predetermined schedules for TWT start time 402, SP duration 404, SP interval 410, etc.

In one approach, the computing device 110 and HWD 150 may dynamically adjust a TWT start time 402, the SP duration 404, and/or the SP interval 410 by analyzing a packet header 507. For example, TWT may be adaptive based on the condition(s)/characteristic(s)/type(s) of traffic being transmitted and/or received. The computing device 110 and/or HWD 150 may analyze one or more bits (or indicators) of a packet header of a traffic packet that is received/transmitted to dynamically adjust TWT.

In one example, the computing device 110 and/or HWD 150 may use an end of service period (ESOP) bit 515 in the packet header 507 to transmit/convey/indicate traffic information. The ESOP bit 515 may be used to indicate whether more traffic is to be transmitted and/or received between the computing device 110 and the HWD 150. For instance, the ESOP bit 515 in the packet header 507 may be set to '0', indicating that more traffic is to be transmitted by the computing device 110 and/or HWD 150 (or that the last packet is not being transmitted yet). The computing device 110 and/or HWD 150 may set the ESOP bit 515 in the packet header to '1' to indicate that a last packet is being transmitted. That is, the ESOP bit 515 may indicate, or be used to determine when the computing device 110 and/or HWD 150 has finished/completed transmission in the current service period.

In one example, the computing device 110 and the HWD 150 may use a buffer status report (BSR) field 517 in a packet header to indicate whether there is more traffic to be transmitted. For instance, one or more bits in the BSR field 517 in the packet header 507 may be set to '0', indicating that more traffic is to be transmitted by the computing device 110 and/or HWD 150. The computing device 110 and/or HWD 150 may set one or more bits in the BSR field 517 in the packet header to '1' to indicate that a last packet is being transmitted. The BSR field 517 may be found in packet headers configured for IEEE 802.11ax/ay communication protocol.

In one example, the computing device 110 and the HWD 150 may use one or more bits in a packet header 507 (e.g., the "more data" field 519 in a packet header 507) associated with an acknowledgement frame, data frame, management frame and the like, to indicate whether more traffic is to be transmitted. For instance, one or more bits in the packet header 507 may be set to '0', indicating that more traffic is to be transmitted by the computing device 110 and/or HWD 150. The computing device 110 and/or HWD 150 may set one or more bits in the packet header 507 to '1' to indicate that a last packet is to be transmitted.

In one example, a maximum time/timing/duration parameter 509 (sometimes referred as max parameter) for the SP duration 404 may be set and utilized to ensure power savings and ensure fairness of channel access. The max parameter for the SP duration 404 may be a parameter such as a timing or timer parameter. As discussed above, the SP duration 404 may be extended to allow communication of data to obviate waiting for the next SP duration 404 and achieve latency reduction. Independent of the extension of the SP duration 404, the computing device 110 and/or the HWD 150 may keep track of the time duration of the computing device 110 and/or the HWD 150 has remained in the wake up state for communication. If the time duration reaches the maximum time as indicated by the max parameter 509, the computing device 110 and/or the HWD 150 may enter the sleep state to ensure a sufficient sleep duration and allow other devices to share or access the communication channel. That is, the max parameter 509 may prevent the computing device 110 and the HWD 150 from continuously remaining in wake-up state. In one approach, when a first device (e.g., computing device 110) determines that the first device has operated or remained in the wake up state for the maximum time as indicated by the max parameter 509, the first device may transmit one or more indicators to notify a second device (e.g., HWD 150) that the first device is entering the sleep state. In response to the one or more indicators, the second device may enter the sleep state. The first device may enter the sleep state after transmitting the one or more indicators.

In step 506, in the event the conditions for the sleep state have been satisfied, the computing device 110 and/or HWD 150 may enter the sleep state. The conditions for entering into the sleep state may include reaching the default time to enter the sleep state (e.g., the scheduled end of the SP duration 404), operating in the wake-up state for the maximum time as indicated by the maximum timing parameter 509 of the SP duration, and/or receiving an end of traffic indication (e.g., an '1' indicated by the ESOP bit 515 in a packet header).

The HWD 150 and the computing device 110 may wait for the transmission and reception of an end of traffic indication before entering a sleep state to minimize the possibility, for instance, of the computing device 110 entering a sleep state while the HWD 150 still is to send traffic or is in the process of sending traffic to the computing device 110. That is, the HWD 150 and the computing device 110 may both receive indications that they each have respectively finished transmitting traffic. In some embodiments, a first device (e.g., computing device 110 or HWD 150) may receive a first end of traffic indication (e.g., ESOP bit=1) from the second device, and may send a second end of traffic indication (e.g., ESOP bit=1) to the second device, before the first device may enter sleep state/mode.

Figure 6:
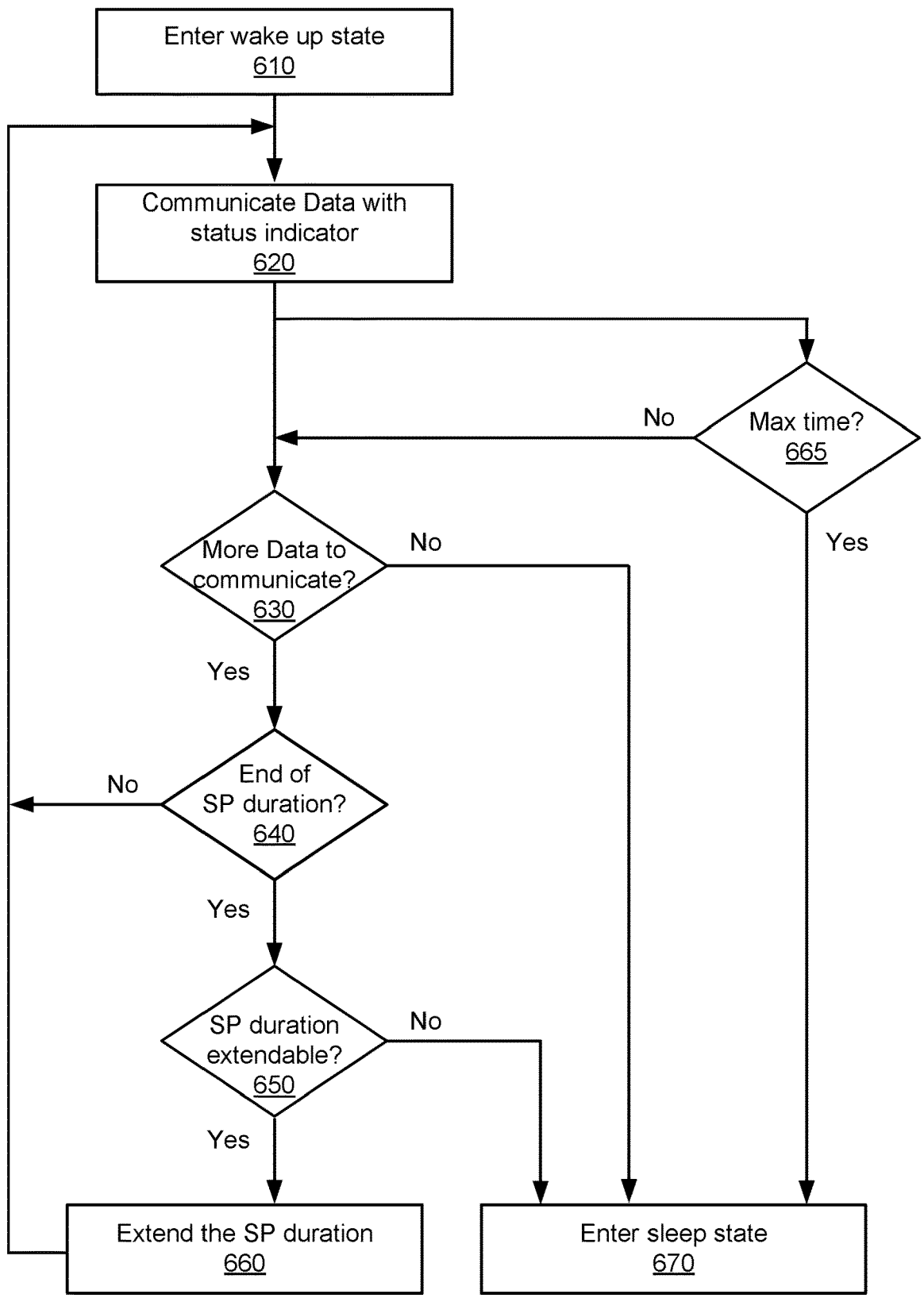
FIG. 6 is a flowchart showing a process of adaptively adjusting a service period duration, according to an example implementation of the present disclosure.

FIG. 6 is a flowchart showing a process 600 of adaptively adjusting a service period duration 404, according to an example implementation of the present disclosure. In some embodiments, the process 600 is performed by the computing device 110. In some embodiments, the process 600 is performed by other entities (e.g., access point 105 or HWD 150). In some embodiments, the process 600 includes more, fewer, or different steps than shown in FIG. 6.

In one approach, the computing device 110 enters 610 a wake up state at the TWT start time 402. During the SP duration 404, the computing device 110 may operate in the wake up state to enable the processor 118 and the wireless interface 115. The SP duration 404, the SP interval 410, and/or the TWT start time 402 may be predetermined. One or more of the SP duration 404, the SP interval 410, and/or the TWT start time 402 may be dynamically negotiated or adjusted according to traffic or channel condition. When the computing device 110 operates in the wake up state during the SP duration 404, the HWD 150 may also operate in the wake up state.

In one approach, the computing device 110 operating in the wake up state during the SP duration 404 communicates 620 data, for example, with the HWD 150. In one example, the HWD 150 generates sensor measurement data indicating a location and/or an orientation of the HWD 150, and transmits the sensor measurement data to the computing device 110 during the SP duration 404. The computing device 110 may receive the sensor measurement data, and generate image data corresponding to a view of artificial reality space corresponding to the location and/or the orientation of the HWD 150 during the SP duration 404. The computing device 110 may transmit the image data to the HWD 150 during the SP duration 404. Based on the image data, the HWD 150 may render an image of the view of artificial reality space.

In some embodiments, the computing device 110 or the HWD 150 may include one or more indicators (e.g., ESOP bit 515, buffer status report 517, more data fields 519, etc.) to notify whether additional data (or more data) exists for transmission by the computing device 110. For example, ESOP bit 515 may be set to '1' to indicate that a last packet is being transmitted or no more additional data exists for transmission for the SP duration 404. For example, ESOP bit 515 may be set to '0' to indicate that the last packet is not being transmitted or more additional data exists for transmission by the computing device 110 for the SP duration 404.

In one approach, the computing device 110 determines 630 whether additional data to communicate exists. The computing device 110 may determine that there is no additional data to transmit, if the last packet of data for the SP duration 404 is transmitted to the HWD 150. Similarly, the computing device 110 may determine that there is no additional data left to receive, if the computing device 110 receives one or more bits indicating that there is no additional data left for transmission by the HWD 150 (e.g., as indicated by ESOP of the HWD 150). If there is no additional data left to transmit and receive for the remainder of the SP duration 404, the computing device 110 may enter 670 the sleep state during the sleep duration 406 until the next TWT start time 402'. During the sleep duration 406, the computing device 110 may operate in the sleep state to disable the wireless interface 115 and the processor 118 thereby achieving power savings. The HWD 150 may also determine that there is no additional data left to transmit and receive for the reminder of the SP duration 404 in a similar manner based on one or more indicators from the computing device 110, and operate in the sleep state to disable the wireless interface 165 and the processor 170 during the sleep duration 406.

In one approach, if there is data left/remaining to receive or transmit, the computing device 110 may determine 640 whether an end of SP duration 404 has reached or not. If the end of SP duration 404 has not reached, the computing device 110 may proceed to the step 620. If the end of SP duration 404 has reached but additional data for communication exists, the computing device 110 may determine 650 whether SP duration is extendable. For example, the computing device 110 may determine whether the SP duration 404 exceeds a maximum duration allowed, for example, as indicated by the max parameter 509. If the SP duration 404 exceeds the maximum duration, the computing device 110 may determine that the SP duration 404 is not extendable. In response to determining that the SP duration 404 is not extendable, the computing device 110 may enter the sleep state in the step 670. If the SP duration 404 does not exceed the maximum duration, the computing device 110 may determine that the SP duration 404 is extendable. In response to determining that the SP duration 404 is extendable, the computing device 110 may extend 660 the SP duration 404 and proceed to the step 620. In one approach, the computing device 110 may extend the SP duration 404 by a predetermined time duration (e.g., 0.1 ms). Alternatively or additionally, the computing device 110 may determine the time duration for transmitting remaining data left to transmit/receive, and can extend the SP duration 404 by the determined time duration.

In some embodiments, the computing device 110 independently determines 665 whether the SP duration 404 has reached (or has been extended up to) the allowed maximum time as indicated by the max parameter 509. If the SP duration 404 has not reached (or has not yet been extended up to) the allowed maximum time, the computing device 110 may operate without interruption. If the SP duration 404 has reached (or has been extended up to) the allowed maximum time, the computing device 110 may enter the sleep state in the step 670. Entering the sleep state when the SP duration 404 has reached (or has been extended up to) the allowed maximum time can ensure fairness of channel access or channel sharing with other devices. In addition, entering the sleep state when the SP duration 404 has reached the allowed maximum time can prevent excessive power consumption by extending the SP duration 404 beyond the allowed maximum time.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   entering, by a first device, a wake up state to wirelessly communicate with a second device for a service period with a determined duration scheduled according to a target wake time (TWT) protocol;
   monitoring, by the first device, for one or more indicators from the second device indicating that additional data is available for communication;
   extending, by the first device, the service period beyond the determined duration, in response to receiving a first indicator of the one or more indicators;
   communicating, by the first device with the second device, the additional data during the service period extended beyond the determined duration; and
   performing, by the first device, a periodic adjustment of one or more parameters relating to the service period, the periodic adjustment being performed at a frequency according to resolutions of a first clock for image frame generation and a second clock for wireless communication with the second device.

2. The method of claim 1, further comprising:
entering, by the first device after the service period extended beyond the determined duration, a sleep state until a start time of another service period subsequent to the service period.

3. The method of claim 1, further comprising:
receiving, by the first device, a second indicator of the one or more indicators, after extending the service period;
determining, by the first device in response to the second indicator, that further extending the service period responsive to the second indicator would exceed a maximum time duration for the service period; and
bypassing, by the first device, the further extending of the service period, in response to the determination.

4. The method of claim 1, further comprising:
determining, by the first device in response to receiving the first indicator, that further extending the service period responsive to the first indicator would not exceed a maximum time duration for the service period; and
further extending, by the first device, the service period, in response to the determination.

5. The method of claim 1, wherein the first indicator is an end of service period (ESOP) bit, a buffer status report (BSR) bit, or a more data field value.

6. The method of claim 1, wherein
the one or more parameters comprise or indicate at least one of a start time of a first service period, a duration of the first service period, or a duration between the start time of the first service period and a start time of a second service period subsequent to the first service period.

7. The method of claim 6, wherein the frequency of the periodic adjustment is based on a difference between i) a resolution of the first clock of the first device, based on which an image frame is generated, and ii) a resolution of the second clock of the first device, based on which wireless communication with the second device is performed.

8. The method of claim 7, wherein performing the periodic adjustment comprises:
synchronizing, by the first device, the first clock and the second clock of the first device.

9. The method of claim 1, wherein the first device is a head wearable display and the second device is a computing device that generates image data for display by the head wearable display.

10. The method of claim 1, wherein the second device is a head wearable display and the first device is a computing device that generates image data for display by the head wearable display.

11. A first device comprising:
a wireless interface to wirelessly communicate with a second device; and
one or more processors configured to:
cause the wireless interface to enter a wake up state to wirelessly communicate with a second device for a service period with a determined duration scheduled according to a target wake time (TWT) protocol,
cause the wireless interface to monitor for one or more indicators from the second device indicating that additional data is available for communication,
extend the service period beyond the determined duration, in response to receiving a first indicator of the one or more indicators,
cause the wireless interface to communicate with the second device the additional data during the service period extended beyond the determined duration; and
perform a periodic adjustment of one or more parameters relating to the service period, the periodic adjustment being performed at a frequency according to resolutions of a first clock of the one or more processors and a second clock of the wireless interface.

12. The first device of claim 11, wherein the one or more processors are configured to:
cause the wireless interface to enter, after the service period extended beyond the determined duration, a sleep state until a start time of another service period subsequent to the service period.

13. The first device of claim 11, wherein the one or more processors are configured to:
cause the wireless interface to receive a second indicator of the one or more indicators, after extending the service period;
determine, in response to the second indicator, that further extending the service period responsive to the second indicator would exceed a maximum time duration for the service period; and
bypass the further extending of the service period, in response to the determination.

14. The first device of claim 11, wherein the one or more processors are configured to:
determine, in response to receiving the first indicator, that further extending the service period responsive to the first indicator would not exceed a maximum time duration for the service period, and
further extend the service period, in response to the determination.

15. The first device of claim 11, wherein the first indicator is an end of service period (ESOP) bit, a buffer status report (BSR) bit, or a more data field value.

16. The first device of claim 11, wherein
the one or more parameters comprise or indicate at least one of a start time of a first service period, a duration of the first service period, or a duration between the start time of the first service period and a start time of a second service period subsequent to the first service period.

17. The first device of claim 16, wherein a frequency of the periodic adjustment is based on a difference between i) a resolution of the first clock, and ii) a resolution of the second clock.

18. The first device of claim 17, wherein the one or more processors are configured to:
synchronize, for each periodic adjustment, the first clock and the second clock of the first device.

19. The first device of claim 11, wherein one of the first device and the second device is a head wearable display, and wherein the other of the first device and the second device is a computing device that generates image data for display by the head wearable display.

20. A method comprising:
entering, by a first device, a wake up state to wirelessly communicate with a second device for a service period with a determined duration scheduled according to a target wake time (TWT) protocol;
monitoring, by the first device, for one or more indicators from the second device indicating that additional data is available for communication;

determining, by the first device, that a last packet is transmitted to the second device for the service period;

determining, by the first device, that the second device has no additional data left to transmit for the service period, according to the one or more indicators;

entering, by the first device, a sleep state before an end of the service period, in response to determining that the last packet is transmitted to the second device for the service period and in response to determining that the second device has no additional data left to transmit for the service period; and performing, by the first device, a periodic adjustment of one or more parameters relating to the service period, the periodic adjustment being performed at a frequency according to resolutions of a first clock for image frame generation and a second clock for wireless communication with the second device.

* * * * *